(12) United States Patent
Sprague et al.

(10) Patent No.: US 6,449,720 B1
(45) Date of Patent: Sep. 10, 2002

(54) PUBLIC CRYPTOGRAPHIC CONTROL UNIT AND SYSTEM THEREFOR

(75) Inventors: Steven K Sprague, Lenox, MA (US); Gregory J Kazmierczak, Belle Mead, NJ (US)

(73) Assignee: Wave Systems Corp., Lee, MA (US)

( * ) Notice: Subject to any disclaimer, the term of this patent is extended or adjusted under 35 U.S.C. 154(b) by 0 days.

(21) Appl. No.: 09/313,295

(22) Filed: May 17, 1999

(51) Int. Cl.[7] .................................... G06F 1/24
(52) U.S. Cl. ................ 713/171; 713/200; 713/201; 380/255; 380/277
(58) Field of Search .................. 713/160, 168, 713/171, 200, 201; 380/255, 277, 283, 28

(56) References Cited

U.S. PATENT DOCUMENTS

| | | |
|---|---|---|
| 5,764,762 A | 6/1998 | Kazmeirczak |
| 6,105,008 A * | 8/2000 | Davis et al. ................ 705/41 |
| 6,112,246 A * | 8/2000 | Horbal et al. ............... 709/230 |
| 6,178,504 B1 * | 1/2001 | Fieres et al. ................ 713/164 |
| 6,233,341 B1 * | 5/2001 | Riggins ..................... 380/277 |

FOREIGN PATENT DOCUMENTS

| | | |
|---|---|---|
| EP | 0 555 715 A | 8/1993 |
| EP | 0 833 241 A | 4/1998 |

* cited by examiner

Primary Examiner—Thomas R. Peeso
(74) Attorney, Agent, or Firm—Baker Botts L.L.P.

(57) ABSTRACT

A universally available, public cryptographic control unit (crypto unit) is used in a cryptographic system shared by multiple independent users. The crypto unit, which is installed as a peripheral device to a general-purpose computer, loads and unloads encrypted security applets into an onboard RAM memory of the crypto unit, where each security applet is run. The crypto unit and the system of which it is a part, provides a secure internal environment in which only pre-approved security applets are granted permission to load and run. The computing environment within the crypto unit is secured by a cryptographic operation center (OPC) which communicates with each crypto unit. The software developer submits a proposed security applet to the OPC prior to distributing a given security applet in order to obtain the necessary permission for the given security applet. Only if all necessary permissions are obtained from the OPC will a given security applet be allowed to load and run in the crypto unit. When a first security applet is finished running, the crypto unit unloads (swaps out) the presently loaded first security applet in encrypted form to the PC hard drive, and loads (swaps in) the next security applet. The cryptographic context of each security applet is preserved in the file stored on the PC hard drive. In such manner, a single crypto unit is shared among a plurality of independent users.

26 Claims, 11 Drawing Sheets

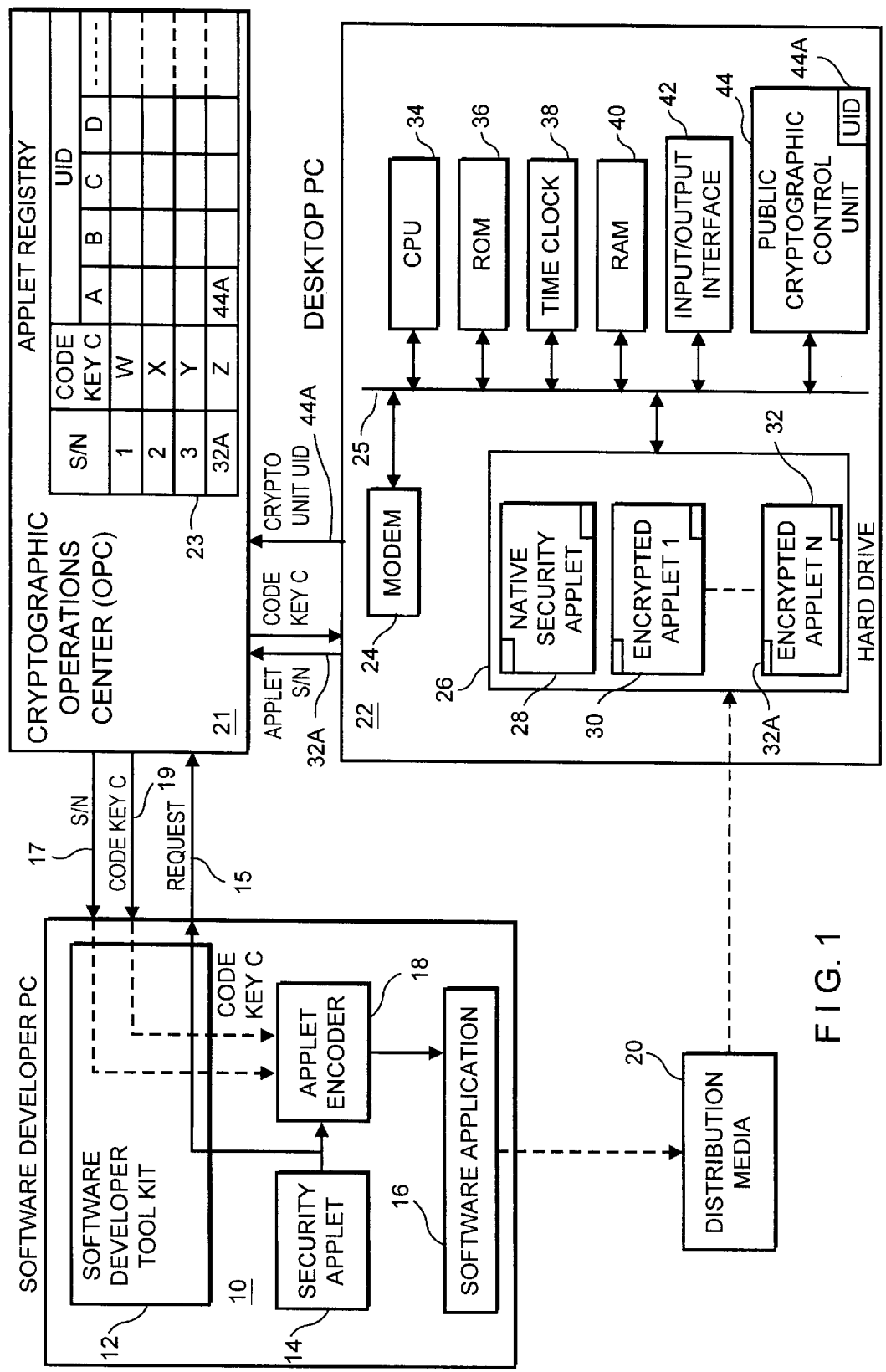
F I G. 1

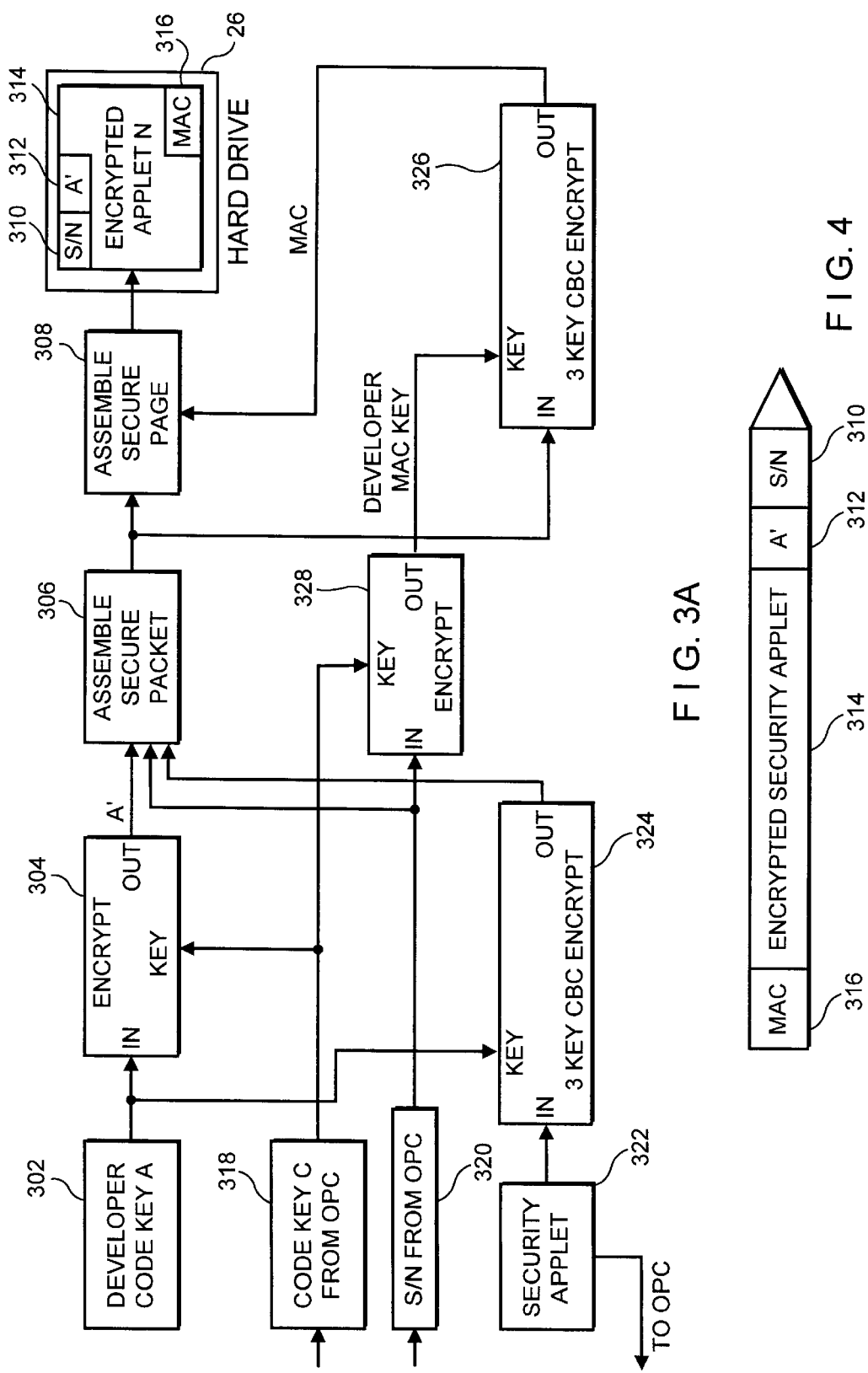

DEVELOPER REGISTRATION OF SECURITY APPLET AT OPC

DESKTOP PC INITIALIZES SECURITY APPLET AT OPC

ROM LOADER CONTROL O/S INITIALIZATION

ROM LOADER CONTROL O/S SWAP-OUT

ROM LOADER CONTROL O/S SWAP-IN

PUBLIC CRYPTOGRAPHIC CONTROL UNIT AND SYSTEM THEREFOR

FIELD OF THE INVENTION

The present invention relates to cryptographic systems. In particular, the present invention relates to a key management system and a shared public cryptographic control unit.

BACKGROUND OF THE INVENTION

Many computer applications need to perform one or more secure functions. A secure function of a computer program is a feature or operation of that computer program that is highly resistant to tampering by the user.

For example, a software program may have an expiration date after which the software program becomes inoperable. However, a typical software expiration function is not secure because it is easily defeated by resetting the local computer clock to an earlier time setting, or by modifying the software to jump over the portion of the program that checks the local computer clock.

As another example, a computer program that keeps a record of data accessed from a local encrypted database for the purpose of charging for the metered use of the local encrypted database typically has two critical registers. A first register represents the amount of past data usage, and another register represents the amount of remaining credit. However, if updating the usage and credit registers is not a secure function, the user could reduce the contents of the usage register and/or increase the contents of the credit register to defeat the system. Similarly, rented software that keeps a record of its own usage for rental charge purposes needs a secure function to prevent the user from tampering with the rental accounting registers, and other critical internal registers and functions.

As another example, a remote access database may charge authorized users for access to the database. A secure function is often needed to authenticate the identity of each user before granting access to the database. Yet another secure function is key management, i.e., the distribution of cryptographic keys to authorized users.

One class of secure function solutions is to implement secure functions in software. Implementing a secure function in software has the advantage of economy. Software implementations also have the advantage of being universal. However, implementing a software secure function in software is not as secure as implementing a secure function in hardware. On the other hand, hardware implementation of a secure function is more costly than software, and may require specialized hardware for each application. If each application requires its own specialized hardware, a hardware implementation of a secure function is not universal.

SUMMARY OF THE INVENTION

The present invention is embodied in a method and apparatus for using a cryptographic control unit as a universally available, public cryptographic control unit (crypto unit) in a system shared by multiple independent users.

The crypto unit contains a general-purpose computer processor having special purpose hardware and firmware to permit secure sharing of the crypto unit resources. In particular, the crypto unit includes a microprocessor core with a dedicated kernel of read only memory (ROM) control programming, a general purpose random access memory (RAM), a real time clock and a host input/output interface (i.e., to or from the desktop PC). In addition, the crypto unit includes a DES (Data Encryption Standard) engine, secure non-volatile storage for cryptographic keys, a signature registry RAM memory and special purpose access register.

The crypto unit is installed as a peripheral device into any general-purpose computer, such as a desktop PC. What makes the crypto unit a "public" cryptographic control unit, is that it is available to the main application program running on the PC as a secure computing resource.

In order to use the crypto unit resources, a portion of the main application program corresponding to the secure function is stored on the PC. The secure functions, which are called security applets herein, are loaded and unloaded into the onboard RAM of the crypto unit, where each security applet is run. By analogy to Java applets, which are downloaded and run inside browsers, a security applet is a portable, executable file intended to be loaded into a suitable computing entity and to perform one or more secure functions. In this sense, the crypto unit is like a special purpose coprocessor adapted for running security applications (applets).

The PC causes the security applet to be loaded into the program control memory of the crypto unit, which runs the applet and returns the result of the secure function to the PC. However, unlike a typical coprocessor, access to the crypto unit is not solely under the control of the desktop PC. That is, the desktop PC may not load and run just any security applet. The crypto unit and the system of which it is a part, provides its secure internal environment only some security applets are granted permission to load and run inside the crypto unit.

To secure the computing environment within the crypto unit, a cryptographic operations center (OPC) is provided which OPC communicates with the crypto unit. In particular, the crypto unit communicates with the OPC the first time a new security applet is encountered, and before the new security applet is allowed to run in the public crypto unit. The crypto unit also communicates with the OPC the first time a new crypto unit is installed on the desktop PC. The crypto unit also communicates with the OPC on a regular periodic basis. Furthermore, the software developer also communicates with the OPC, prior to distributing a given security applet for the purpose of obtaining the necessary permission for the given security applet to load and run in the crypto unit. Only if all necessary permissions are obtained from the OPC will a given security applet be allowed to load and run in the crypto unit.

Operating System

The crypto unit operating system (O/S) consists of two parts: a RON loader control program, and a native mode security applet. The RON loader control program is a compact dedicated kernel of control programming which is stored in ROM in the crypto unit. The native mode security applet, which may be distributed by floppy disk, CDROM or telephone modem, is a portable and writable file typically stored in the hard drive of the desktop PC.

Critical security functions are implemented in the ROM loader control program. In particular, the ROM loader control program controls the loading and unloading of security applets to and from the crypto unit and external sources, including the loading and unloading of the native mode security applet.

The native mode security applet has two main functions: to register the crypto unit at the OPC upon first use of the crypto unit, and to grant permission for the first use of each individual application security applet. As a general rule, the native mode security applet is used whenever the crypto unit communicates with the OPC.

System Operation

Application developers desiring to use the public cryptographic control unit in their secure software application must first submit a proposed security applet to the OPC for consideration. The proposed security applet must meet certain standards including security standards. For example, the proposed security applet must be small enough to fit into the onboard RAM on the crypto unit. The OPC further inspects the proposed security applet for compliance with security standards.

After all security compliance tests are completed, the OPC grants or denies permission for the proposed security applet to use the crypto unit. Permission to use a proposed security applet consists of assigning a serial number and a cryptographic code key C to the approved security applet. The serial number and code key C are stored in an applet registry in the OPC. The developer uses the code key C in a process to encrypt the approved security applet, and uses the serial number to identify the encrypted security applet.

Upon start up initialization of the desktop PC, the crypto unit RON loader control program loads the native mode security applet into onboard RAM in the crypto unit. The ROM loader control program treats the native mode security applet as though it has been previously granted permission from the OPC to load and run in the crypto unit.

The ROM loader control program facilitates the shared use of the crypto unit among multiple users. in particular, the ROM loader control program unloads (swaps out) the native mode security applet from onboard RAM in the crypto unit into the hard drive of the desktop PC to make room for loading (swaps in) a first application security applet into the onboard RAM.

The ROM loader control program then inspects the first application security applet while it is loading. After determining that the loaded first application security applet is entitled to access to the crypto unit resources, the microprocessor in the crypto unit runs the first security applet, thus turning over control of the crypto unit to the first security applet.

When the first security applet is done, the crypto unit unloads (swaps out) the presently loaded first security applet in encrypted form to the PC hard drive, and loads (swaps in) the next security applet. The cryptographic context of each security applet is preserved in the file stored on the PC hard drive. In such manner, a single crypto unit is shared among a plurality of independent users.

If an unknown application security applet is encountered (i.e., a security applet that has never been loaded into this particular crypto unit), the ROM loader control program swaps back in the native mode security applet, which establishes a secure communication session with the OPC. If the software developer who wrote the unknown application security applet has been previously granted permission by the OPC to load and run that security applet, then the crypto unit will receive from the OPC the cryptographic keys needed to decrypt and run the unknown application security applet. At the same time, the OPC records the crypto unit user identification in the applet registry, thereby associating the crypto unit with the security applet for which the OPC has granted permission to load and run. Thereafter, the crypto unit will load and unload the security applet without further communication with the OPC.

Finally, when no application security applet is running, the ROM loader control program swaps in the native mode security applet back into the onboard RAM in the crypto unit. In such manner, each independent user uses the crypto unit for a respective separate secure application. Thus, a plurality of independent users, using a plurality of independent secure applications shares the crypto unit.

BRIEF DESCRIPTION OF THE DRAWINGS

FIG. 1 is a block diagram of a public cryptographic system in accordance with the present invention.

FIG. 3A is a flow chart diagram illustrating a method and apparatus for generating an encrypted applet in accordance with the present invention.

FIG. 4 is a diagram of the secure memory page format for storing an encrypted security applet in a PC hard drive memory.

DETAILED DESCRIPTION

System Operation

Figure 2:
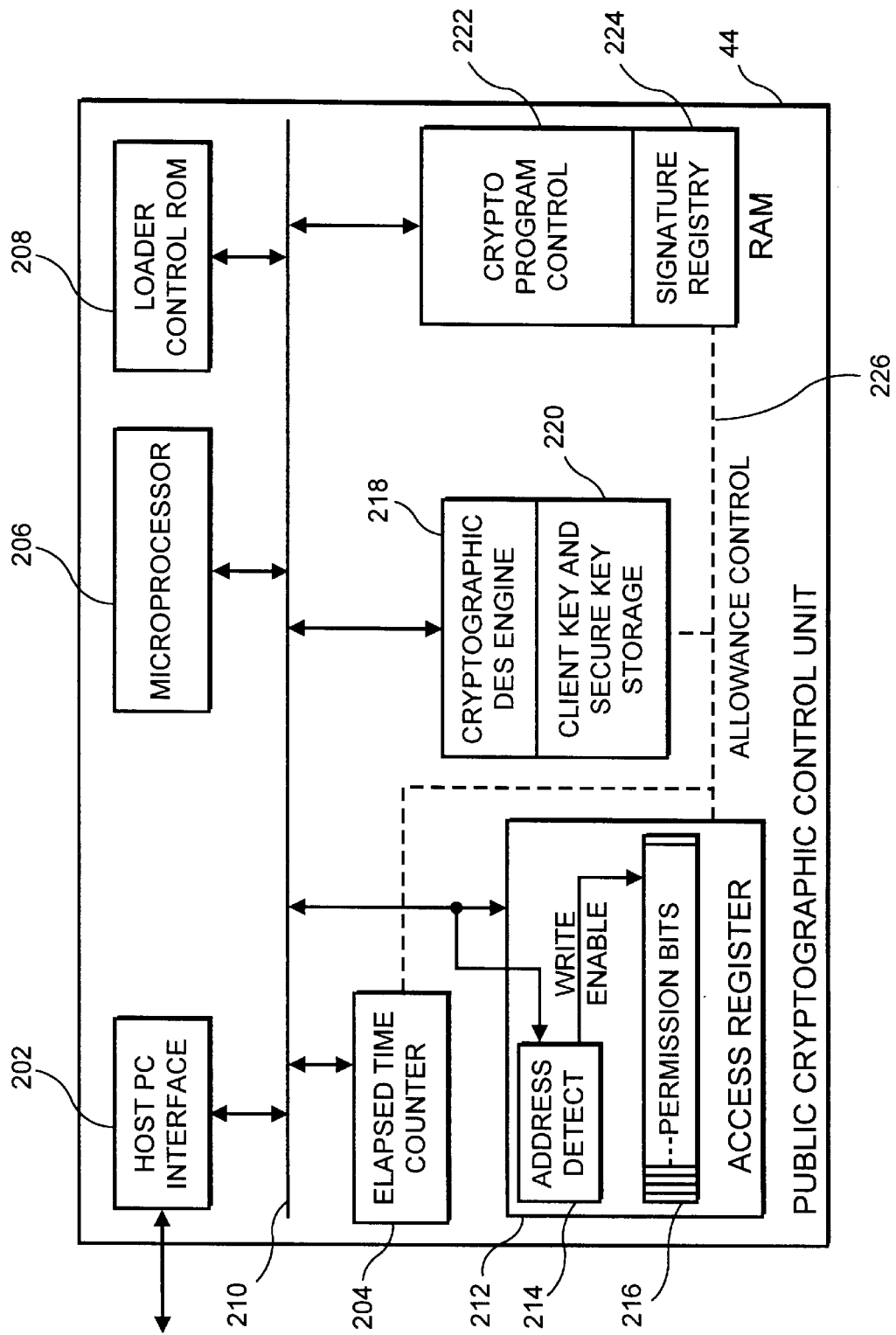
FIG. 2 is a block diagram of a public cryptographic control unit in accordance with the present invention.

A block diagram of a public cryptographic system shown in FIG. 1 includes a cryptographic operations center, OPC 21, a desktop PC 22, a software developer PC 10 and a distribution media 20. The software developer uses a software developer tool kit 12 to create a security applet 14. The security applet 14 is designed to achieve a given secure function as part of a main software application 16. The software developer distributes the software application 16, including the encrypted 18 security applet 14 via some distribution media 20.

In order to encrypt the security applet 14, a software developer at PC 10 sends a request 15 over a secure communications link such as a telephone modem connection to the OPC 21. The request 15 includes the actual proposed security applet 14. In response to the request 15, the proposed security applet 14 is inspected at the OPC 21 for compliance with security standards. For example, a proposed security applet 14 should not attempt to access and output forbidden keys, tamper with the internal elapsed time counter (a secure time clock) or set permission bits (discussed below) in the crypto unit to grant itself access to sensitive areas. If the proposed security applet 14 does not meet security standards for any reason, it will be denied registration.

On the other hand, if the OPC 21 approves the security applet 14 for registration, the OPC 21 will select a unique serial number (S/N) 17 and an arbitrary code key C 19 to be associated with the applet 14. The S/N 17 and code key C 19 are communicated from the OPC 21 to the software developer PC 10 over the same secure telephone modem connection as is used for the request 15. The OPC 21 retains a database of issued S/N's and corresponding issued code key C's in an applet registry 23. The proposed applet is thus officially registered and is granted permission by the OPC 21 to be used by (i.e., be run by) any public cryptographic control unit.

The software developer at PC 12, uses the received code key C in an applet encoder 18 process for encrypting the approved security applet 14. The software developer at PC 12, further uses the received S/N 17 in the applet encoder 18 process to identify the approved security applet 14. The completed security applet (encrypted using code key C 19 and identified using S/N 17) is placed in a software application 16 and distributed via some distribution media 20 such as a floppy disk, CDROM, terrestrial broadcast, satellite, cable television system or the like, to desktop PC 22.

After the software application 16 is installed at the desktop PC 22, the encrypted security applet is stored in the hard drive 26. The hard drive 26 typically holds a plurality of encrypted security applets, 28, 30, 32 which correspond to a plurality of software applications being used on the desktop PC 22. Each stored applet 32 contains an identifying SIN, such as S/N 32A. Desktop PC 22 further includes standard PC components such as a modem 24, CPU 34, ROM 36, time clock 38, RAM 40 and input/output interface 42 connected over a standard PC bus 25. In addition, the desktop PC 22 includes a crypto unit 44 having a unique unit identity (UID) 44A, which is coupled to bus 25.

In operation, the first time a software application 16 stored on the desktop PC 22 hard drive 26 requires the execution of an encrypted applet 32, the desktop 22 establishes a secure communication session with the OPC 21. The desktop PC 22 requests permission from the OPC 21 to use the encrypted applet 32. To obtain permission, the crypto unit 22 sends its UID 44A and the S/N 32A of the security applet 32 to the OPC 21.

The OPC 21 uses the previously supplied unique S/N 17 to lookup the corresponding arbitrarily supplied code key C in the applet registry 23. Also, the OPC 12 enters the transaction (use of S/N 32A by crypto unit 44) by adding to the applet registry 23. The applet registry 23 is a record of all registered security applet S/N's, the code key C that corresponds to each S/N, and all of the crypto unit UID's that have been granted permission to run each corresponding security applet. For example, the registry 23 shows that encrypted applet S/N 32A corresponding to cryptographic code key C=Z, has been registered, and that crypto unit UID=44A has been granted permission to decrypt and execute (run) the registered applet with S/N=32A.

Public Cryptographic Control Unit

A public cryptographic control unit 44 in FIG. 2 comprises microprocessor 206, RAM memory 222, 224 and ROM memory 208. The RAM memory is allocated to storage of a signature registry 224 and a main crypto program control 222 area. The ROM 208 contains the loader control program portion of the O/S. Also included in the crypto unit 44 is a DES engine 218, a non-volatile memory 220, an elapsed time (real time) counter 204 and an access control register 212. A host (desktop) PC interface 202 is provided for communication between the crypto unit 44 and the host PC. Communication within the crypto unit 44 is provided over a general-purpose data bus 210 carrying address and data between components within the crypto unit 44.

The DES engine 218 facilitates cryptographic operations within the protected environment of the crypto unit 44. For example, internal non-volatile memory 220 provides secure storage of cryptographic keys. The elapsed time counter 204 permits tamper proof time and date calculations within the secure environment of the crypto unit 44. Critical operations, such as reading or writing to the elapsed time counter 204, accessing or changing the contents of key storage in non-volatile memory 220, accessing or changing the contents of the signature registry 224 are restricted by hardware. In particular, access to the crypto unit is controlled by setting the individual permission bits 216 (discussed below) of the access register 212.

The access register 212 includes a special protection feature to prevent a security applet loaded in the program control RAN 222 from compromising the secure features of the crypto unit 44. In particular, the access register 212 includes a permission register, and the individual permission bits 216 of the access register 212 define which resources a given security applet will be allowed to access. For example, hardwired signals (allowance controls) 226 provide hardwired limitations as to whether a given security applet loaded in RAM 222 will be allowed to access all or part of the signature registry 224, elapsed time counter 204, and the client key and secure key storage area 220. The secret client key is unique to each crypto unit and is stored in non-volatile memory 220 at the time of manufacture as well as other cryptographic keys.

A given security applet in RAM 222 is allowed to access (read or write) critical operations only as granted permission from the access register 212. The permission register is loaded from the decrypted security applet by the loader control ROM 208 program. As a further precaution against unauthorized access, the permission register 216 may only be accessed from instruction execution in the loader control ROM 208. An address detect 214 is performed whenever the permission register is being written with a new value. In particular, only if the address detect 214 indicates that the loader control ROM is performing the permission bit loading, will the write enable signal from the address detect 214 be active. In such manner, the permission register 216 may only be loaded by the proper instruction sequence from the loader control ROM 208. Therefore, security applets running out of RAM 222 may not change the permission bits of permission register 216.

Permission Bits of the Access Register

Individual permission bits 216 of the access register 212 provide control of the elapsed time counter 204. In particular, one permission bit controls whether the elapsed time counter 204 may be read, and another permission bit controls whether the elapsed time counter 204 may be written. Only the OPC, through the native mode security applet, is given permission (via the setting of a permission bit) to write a value into the elapsed time counter.

Individual permission bits 216 of the access register 212 provide control over the client key and secure key storage in non-volatile memory 220. In particular, one permission bit determines whether the applet has access to read (but not write) the client key. The client key is factory installed and may not be changed. The client key may be used in cryptographic calculations relating to a secure applet by any software developer.

Other keys stored in non-volatile memory 220 include private keys for specific software developers. That is, a given software developer may not use the shared client key. Instead, a private key may be dedicated for such given software developer. In such case, the permission bit corresponding to a dedicated private key permits security applets from the given software developer to access the dedicated private key. Security applets from other software developers will not set the permission bit for such dedicated private key, and accordingly will not have access to the dedicated private key. In addition, a separate permission bit 216 of access register 212 defines whether the loaded security applet may write a new dedicated private key over an old dedicated private key in non-volatile memory 220. In addition to dedicated private keys, non-volatile memory 220 may store digital certificates used to authenticate the public key portion of a public-private key pair.

Individual permission bits 216 of the access register 212 are used in conjunction with the signature registry portion 224 of the RAM to provide further access control as to which security applets may be loaded and unloaded into the crypto unit. In particular, setting a cancellation flag in a selected entry in the signature registry will cancel the selected security applet. The crypto chip will thereafter not load or unload a security applet designated by a cancellation flag in the signature registry. Finally, the OPC may inactivate the entire crypto unit 44 by setting an appropriate permission bit 216 that inactivates the crypto unit 44. An inactivated crypto unit 44 may not run any security applet, unless the crypto unit 44 is reactivated by the OPC.

Security Applet Registration

As indicated, application developers design security applets as part of a main application program. The security applet is written specifically to run on the crypto unit 44. The security applet must be compact enough to fit in the onboard RAM (222 in FIG. 2) of the crypto unit. Security applications too large to fit into the onboard RAM may be divided into two parts, i.e., into two security applets. Before a security applet can be distributed with the main application program and run on a crypto unit, the developer must register the security applet with the OPC. As indicated, the developer establishes a secure communication session with the OPC. A system suitable for secure communication with the OPC is shown in U.S. Pat. Nos. 5,615,264, 5,761,283 and 5,764,762.

Figure 5:
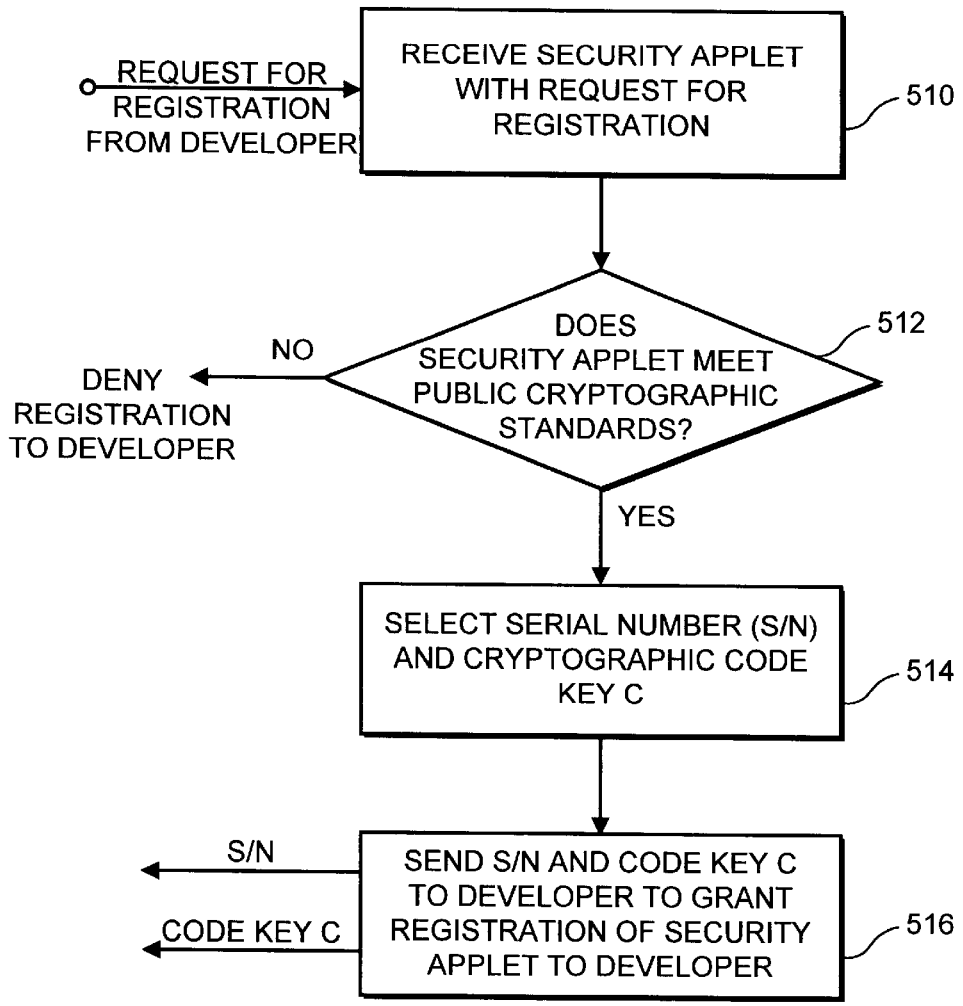
FIG. 5 is a flow chart diagram illustrating the process of developer registration of a security applet at the cryptographic operations center in accordance with the present invention.

FIG. 5 shows the developer registration process at the OPC. The OPC receives a request for security applet registration at step 510. The request includes the actual proposed security applet. The OPC inspects the proposed security applet for appropriate cryptographic standards at step 512. For example, the proposed security applet may not attempt to discover the client key that is unique to each individual crypto unit, or any other secure key. There can be neither export of code nor import of additional code. Indirect program jumps are a security risk, as are indexed program loops. As a result of experience from attacks on the security of the system, numerous tests can be designed to assure that the proposed security applet is safe and properly designed. If the proposed security applet fails to pass any test, the OPC denies registration of the proposed security applet at step 512.

If all tests are passed, the OPC selects a serial number S/N and a cryptographic code key C at step 514. The OPC also enters the S/N and code key C in an applet registry (23 in FIG. 1) at step 514.

The registration process is completed by sending the S/N and code key C for the newly registered applet to the software developer at step 516.

Cryptographic Conventions Used

FIGS. 3A, 3B, 9A and 9B show symbols representing cryptographic operations. As used herein, the preferred process for encryption and decryption is the Data Encryption Standard (DES).

Briefly, for the electronic code book mode (ECB) of DES, an input block of 64 bits (8 bytes) is transformed into an output block of 64 bits in accordance with a 56 bit key. For decryption the reverse process is carried out, transforming 64 input bits to 64 output bits using the same 56 bit key. DES keys are typically represented in 64 bit, 8 byte quantities, with each byte having seven bits plus one parity bit, or 56 key bits plus 8 parity bits.

As used herein, performing a cryptographic operation on a variable under a secret key means to encrypt (or decrypt) that variable (usually a key) using the secret key to generate another key. Encryption may be performed under a single key, or under multiple keys, such as a triple key set. Unless otherwise indicated, encryption or decryption shall mean ECB mode of DES encryption or decryption under a triple key set. For triple key encryption, a key set of three keys (key 1, key 2, key 3) is used to encrypt a variable using DES as follows: encrypt with key 1, decrypt with key 2, and encrypt with key 3. Triple key decryption is the reverse—decrypt with key 3, encrypt with key 2, and then decrypt with key 1. CBC shall mean the cipher block chaining mode of the DES standard using an initial vector, IV. Unless otherwise stated, the IV for a CBC DES encryption or decryption shall be zero.

Crypto Unit Initialization and Registration

Figure 7:
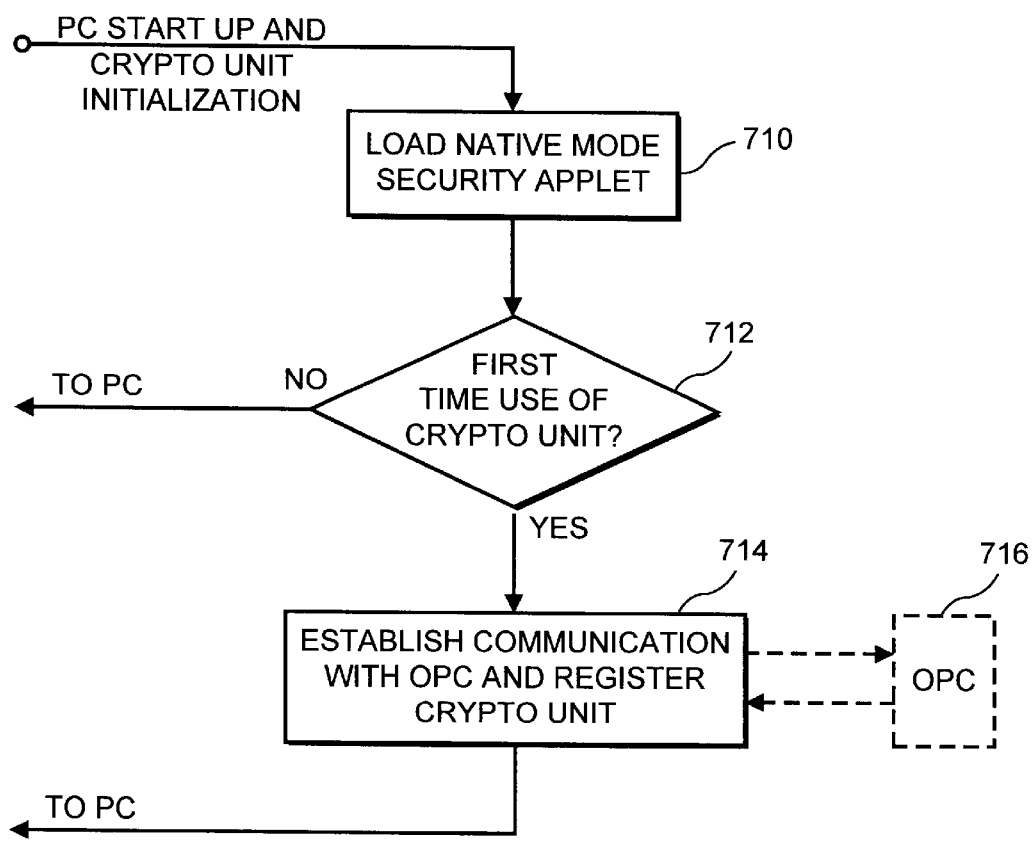
FIG. 7 is a flow chart diagram illustrating the method of crypto unit initialization by the ROM loader control program portion of the O/S in accordance with the present invention.

FIG. 7 illustrates the method of crypto unit initialization and registration by the RON loader control program. Upon powering up, the RON loader control program (in ROM 208 of FIG. 2) loads an initial native mode security applet from the hard drive (26 in FIG. 1) into the onboard RAM (222 in FIG. 2) at step 710. The ROM loader control program considers the initial native mode security applet to be pre-approved and encrypted with a fixed key. The initial native mode security applet is granted access to the full resources of the crypto unit by enabling all permission bits of the access register 216. After loading, control of the crypto unit is passed to the initial native mode security applet that has just been loaded into the onboard RAM.

If this is the first time the crypto unit was used, a registration process is initiated at step 712. A secure communication session with the OPC is established at step 714, and the crypto unit enters a registration process with the OPC 716. Registration consists of entering data identifying the user (name, address, etc.) and forwarding the user data associated with the UID of the crypto unit to the OPC. During the communication session with the OPC 716 at step 714, the OPC 716 has an opportunity to download any program changes to update the initial native mode security applet. After the registration process is complete, program control is returned to the desktop PC. The crypto unit then enters a wait state until the desktop PC is ready to load the first security applet in the crypto unit to be run.

Encryption of a Registered Security Applet

Security applets are encrypted. FIG. 3A is a flow chart diagram of the encryption key suite for security applet encryption. The software developer begins with the desired security applet 322. As indicated above, the security applet 322 has been previously sent to the OPC by the software developer, and an applet S/N 320 and code key C 318 have previously been received as part of the applet registration process.

The software developer selects a code key A (the programmer key) of its own choosing at step 302. Code key A is then encrypted in encryptor 304 under code key C to form encrypted code key A'. The security applet 322 is triple key CBC encrypted in encryptor 324 under code key A. A message authentication code (MAC) is calculated in encryptor 326. The MAC (also known as a manipulation detection code) is a digital signature appended to an encrypted packet that is checked by the receiver of the encrypted packet to verify that the contents of the encrypted packet have not been changed. The MAC is generated by assembling the S/N 320, code key A' and the encrypted security applet from the output of encryptor 324 into a secure packet at step 306.

The purpose of assembling a secure packet 306 is to generate a MAC 316 in encryptor 326 and append it to the secure packet to form a secure page. The developer MAC key is formed by encrypting the S/N 320 under the code key C 318 in encryptor 328. The MAC signature itself is generated by triple key CBC encrypting 326 over the secure packet 306. In particular, the last portion of the output of encryptor 326 forms the MAC signature 316, which is appended to the secure packet 306.

The computed MAC is combined with the secure packet 306 to form a secure page 308, which is outputted from the crypto unit and ultimately stored in the hard drive 26 of the host PC.

The format of the secure memory page for storing an encrypted security applet in a PC hard drive memory is shown in FIG. 4. The secure memory page begins with the secure packet (S/N 310 followed by the code key A' 312, followed by the encrypted security applet 314) and is terminated with the computed MAC 316.

Initial Loading and Decryption of a Security Applet

Figure 3B:
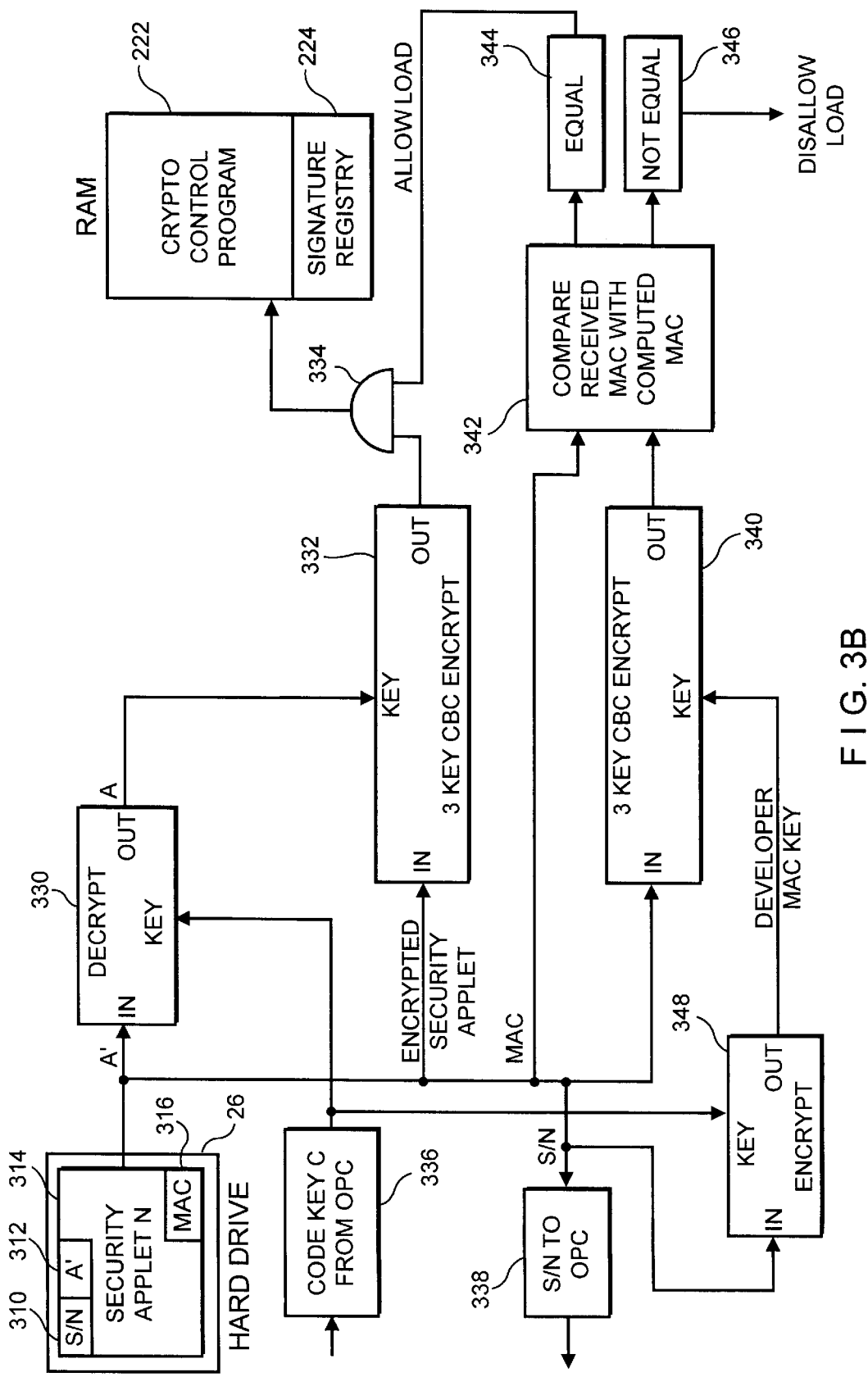
FIG. 3B is a flow chart diagram illustrating a method and apparatus for decrypting an encrypted applet and loading the decrypted applet into the onboard RAM of a public cryptographic control unit in accordance with the present invention.

The crypto unit decrypts an initially encountered encrypted security applet as shown in the encryption key suite flow chart diagram of FIG. 3B. Since this is an initial loading of a security applet that has not been run before, the S/N 310 will not be found in the applet signature registry portion of RAM 224. (In the case where the S/N is found in the signature registry 224, the encrypted applet has been run before, and FIG. 9A will be applicable). As previously indicated, for an initially encountered security applet, the native mode security applet has sent the S/N 338 to the OPC, and received code key C 336 from the OPC.

First, the software developer code key A is recovered by decrypting code key A' 312 in decryptor 330 under code key C 336. The encrypted security applet 314 is triple key CBC decrypted in decryptor 332 under recovered code key A from the output of decryptor 330. The MAC for the secure packet (S/N 310, code key A' 312 and encrypted security applet 314) is computed in triple key CBC encryptor 340 under the developer MAC key. The developer MAC key is computed by encrypting the S/N 338 under the code key C 336 in encryptor 348, which is coupled to the key input of encryptor 340.

The computed MAC at the output of encryptor 340 is compared with the received MAC 316 in comparator 342. If the computed MAC and received MAC are equal 344, then AND gate 334 is enabled, and the decrypted security applet at the output of decryptor 332 is stored in the crypto control portion 222 of onboard RAM. However, if the computed MAC and received MAC are not equal 346, then the security applet will not be allowed to load into onboard RAM 222 and run. Instead, AND gate 334 is not enabled, and the decrypted security applet at the output of decryptor 332 is not stored in the crypto control portion 222 of onboard RAM. An error message is returned to the desktop PC.

OPC Control Over Security Applet Loading

Figure 6:
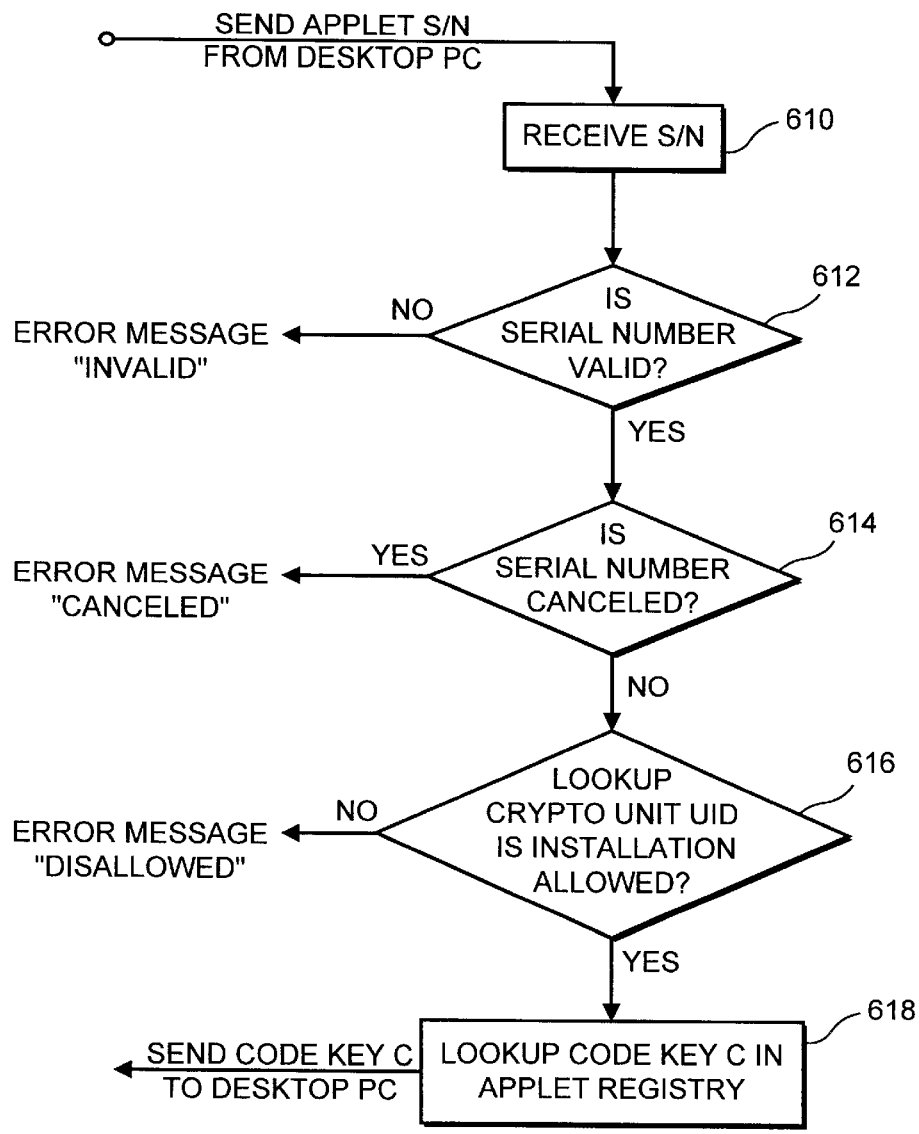
FIG. 6 is a f low chart diagram illustrating the process of the desktop PC initialization of a security applet at the cryptographic operations center in accordance with the present invention.

The present system gives the OPC control over whether a security applet can be loaded into a given crypto unit. FIG. 6 illustrates the initial loading control process at the OPC. After receiving the S/N form the desktop PC at the OPC at step 610, the OPC checks whether the applet has a valid S/N at step 612. If not, the OPC returns an error message that the security applet is "INVALID". The OPC checks whether S/N, if originally valid, has since been cancelled at step 614. If so, the OPC returns an error message that the security applet has been "CANCELLED". The OPC checks whether the given crypto unit, identified by its UID, is allowed to load this particular security applet 616. If not, the OPC returns an error message that the loading of the security applet is "DISALLOWED". If the S/N is valid, not cancelled, and the crypto unit is allowed to load the security applet, code key C is looked up in the applet registry at the OPC and sent to the crypto unit at step 618.

In such manner, the OPC maintains control over initial security applet installation. For example, if a security applet has been rewritten to correct a problem, the OPC will not allow subsequent users to install the earlier version into the crypto unit. If a given crypto unit UID is known to be compromised, no further security applet loading will be allowed for that crypto unit UID.

ROM Loader Control O/S—Cryptographic Context Swapping

The ROM loader control program (O/S) of the crypto unit supports multiple simultaneous users. To switch among users, the cryptographic context of the current security applet is unloaded from the crypto unit and stored in the hard drive of the desktop PC. Then, by retrieving a previously stored cryptographic context of a previously run security applet from the hard drive of the desktop PC, the crypto unit is restored to a previous cryptographic state corresponding to such previously run security applet. As used herein, the terms "encrypted security applet", "cryptographic context" and "encrypted security applet in (with or including) its cryptographic context" are all intended to be substantially equivalent terms.

In the present embodiment, the software developer configures the security applet to save the cryptographic parameters in the crypto program control portion 222 of onboard RAM (FIG. 2) before the program exits. The software developer anticipates which security parameters are needed for its security application and will be required to restore the crypto unit to its previous cryptographic state and continue the security application.

In some security applications, all of the cryptographic parameters of the crypto unit will be needed to restore the crypto unit. In other security applications, only a subset of the cryptographic parameters will be needed. In an alternate embodiment, the crypto unit automatically stores the entire cryptographic state of itself (the crypto unit) in a separate file associated with each security applet. In the latter case, the burden of switching cryptographic states (storing and restoring cryptographic contexts) is carried out automatically by operation of the crypto unit, and without intervention by the developer software.

In the present embodiment, the cryptographic context file for a given security applet includes the security applet plus the cryptographic state of the crypto unit. The format of the cryptographic context is given below:

TABLE I

| CRYPTOGRAPHIC CONTEXT (29K) |
| --- |
| Cleartext Header: |
| Serial no. (S/N), size, |
| revision #, time stamp |
| Program data - the security applet |
| Persistent register storage |
| Heap (temporary storage) |
| Stack |
| MAC/ signature |

Except for the cleartext header, the cryptographic context is encrypted. The cleartext header consists of the following fields:

Serial no. (S/N): The S/N is the original serial number issued to the software developer for the security applet during the registration process.

Size: Corresponds to the number of bytes in the cryptographic context to be unloaded from the crypto unit and stored in the hard drive.

Revision #: Used for tracking changes to the originally registered security applet.

Time stamp: Corresponds to the contents of the crypto unit real time clock at the time of unloading.

The encrypted portion of the cryptographic context consists of the following fields:

Program data: The security applet including any modifications made during program execution.

Heap (temporary storage): Parameters representing the cryptographic state of the crypto unit just prior to unloading.

Stack: Program stack storage such as return addresses for nested subroutines.

MAC/signature: The MAC computed over the entire cryptographic context.

Table II—Signature Registry

The signature registry 224 portion of onboard RAM has the following format:

| Serial no. (S/N) | MAC (signature) | Flags |
| --- | --- | --- |
| S/N 1 | MAC 1 | Flag 1 |
| S/N 2 | MAC 2 | Flag 2 |
| --- | --- | --- |
| S/N 31 | MAC 31 | Flag 3 |

S/N: Serial number of applet

MAC: Message authentication code for the applet cryptographic context stored in the PC hard drive.

Flags: Flags stored in the signature registry include an applet cancellation flag, which is set by the OPC to prevent any further use of the cancelled applet.

Figure 8A:
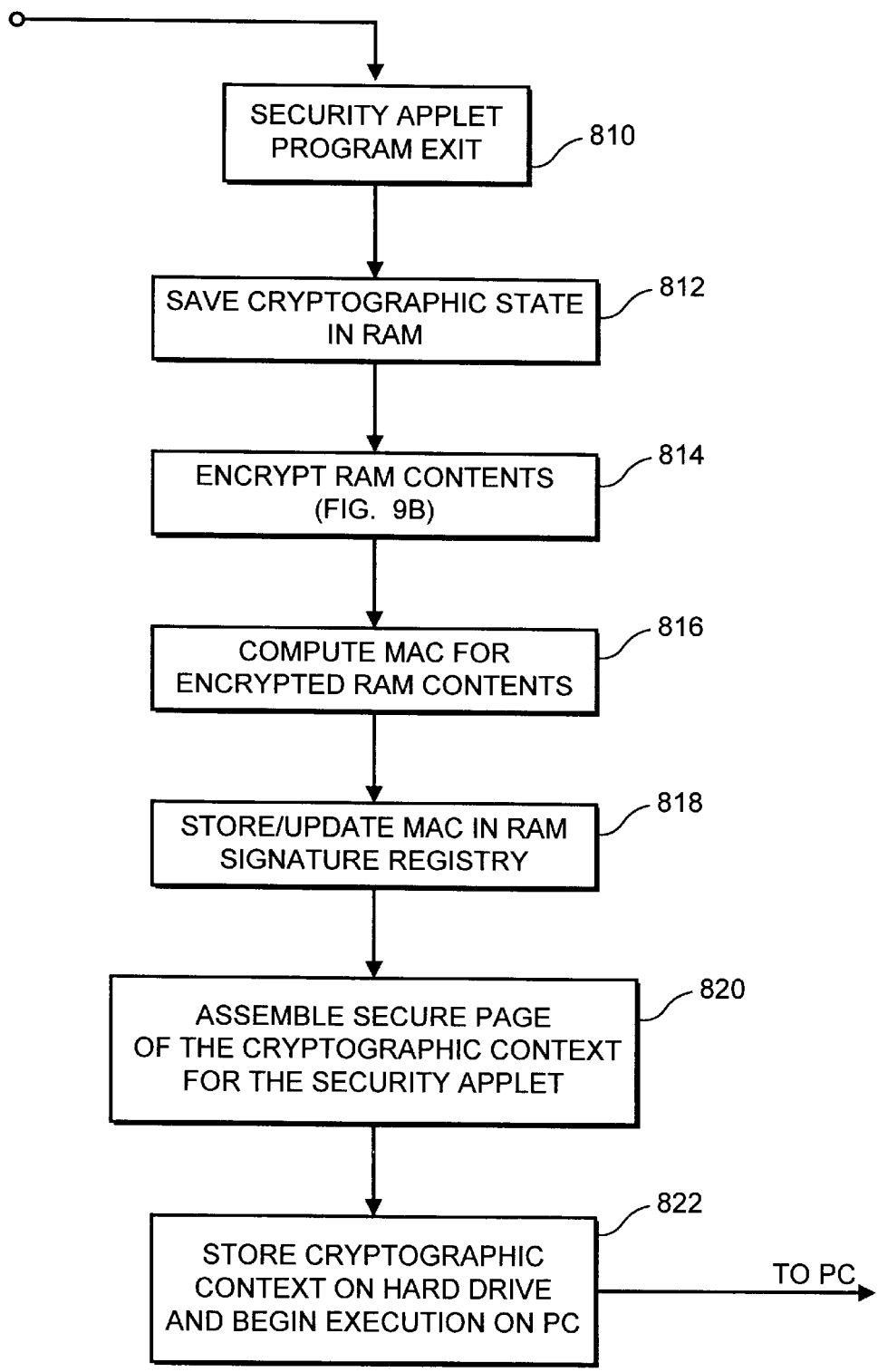
FIG. 8A is a flow chart diagram of the ROM loader control program portion of the O/S showing a method for unloading (swapping out) a security applet from the crypto unit to the PC in accordance with the present invention.

FIG. 8A ROM Loader Control O/S—Swap Out

A flow chart diagram of the swap out portion of the ROM loader control program (O/S) is shown in FIG. 8A. The function of the swap out portion of the operating system is to unload the security applet currently running in the crypto unit, including its cryptographic context, to the hard drive of the desktop PC. For example, the security applet may have internal register storage, stack pointers and other program parameters, which are modified during execution and constitute part of its cryptographic context.

In FIG. 8A, when the current security applet is done at step 810, the cryptographic state of the crypto unit is saved in onboard RAM at step 812. The stored cryptographic state includes the state of DES engine (218 in FIG. 2) and any other variable needed to restore the crypto unit to its current condition. Then, the RAM contents are encrypted at step 814 (in accordance with the encryption key suite shown in FIG. 9B). The MAC for the encrypted RAM contents including the clear text header and S/N is computed at step 816, and the MAC is stored (or updated) in the RAM signature registry 224 at step 818. A secure page is assembled at step 820 and stored on the hard drive of the desktop PC at step 822.

Figure 8B:
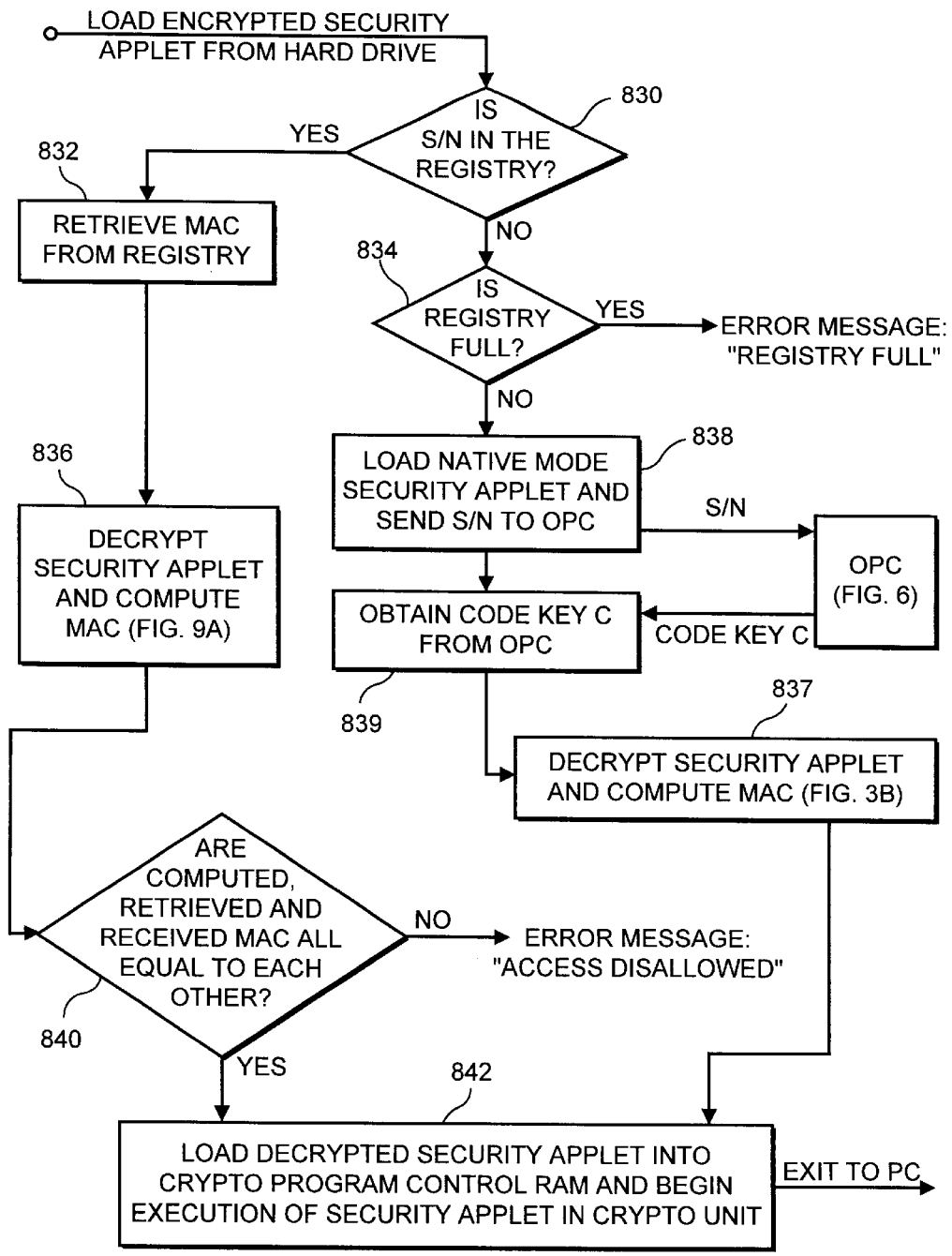
FIG. 8B is a f low chart diagram of the ROM loader control program portion of the O/S showing a method for loading (swapping in) a security applet from the PC to the crypto unit in accordance with the present invention.

FIG. 8B ROM Loader Control O/S—Swap In

A flow chart diagram of the swap in portion of the ROM loader control program (O/S) is shown in FIG. 8B. The function of this portion of the operating system is to load the next security applet to the onboard RAM to run in the crypto unit, including restoring its respective previous cryptographic context, if any, from the hard drive of the desktop PC.

In FIG. 8B, when it is time to load a security applet into onboard RAM, the ROM loader control program first checks whether the S/N is in the signature registry portion of RAM (224 in FIG. 2) at step 830. The presence or absence of the S/N in the signature registry 224 determines whether or not this crypto unit has run this particular security applet before.

If the applet S/N is not in the registry, the crypto unit had not yet run this particular security applet. Then the program checks at step 834 to determine whether the signature registry is full or whether it has room for an additional entry. If the signature registry is full, an error message of "REGISTRY FULL" is returned. If the signature registry is not full, the ROM loader control program swaps in the native mode security applet at step 838, which establishes a secure communication with the OPC as described above in accordance with FIG. 6.

As indicated above in conjunction with FIG. 6, the native mode security applet sends the S/N of the proposed security applet to the OPC at step 838 and obtains a code key C at step 839. Also as indicated above, the crypto unit uses the received code key C to decrypt the proposed security applet and compute the MAC for the security applet at step 837. The decryption key suite for a security applet loaded into a given crypto unit for the first time has been described above in conjunction with FIG. 3B.

If the crypto unit has run this particular security applet before, then the S/N will be found in the registry at step 830. In such case, the MAC is retrieved at step 832 from the signature registry portion of RAM (224 in FIG. 2). The security applet is decrypted (with its cryptographic context) and the MAC is computed in step 836. The key suite for decrypting the stored applet and computing the MAC is described below in conjunction with FIG. 9A.

At this stage of the swap in process, there are 3 MACs associated with the security applet (with its cryptographic context) that the ROM loader control program (O/S) is attempting to load into the onboard RAM of the crypto unit. There is a first MAC retrieved from the signature registry, a second MAC received with the stored cryptographic context from the desktop PC and a third MAC computed over the incoming encrypted applet. If all 3 MACs are equal to each other at step 840, then the decrypted security applet is loaded into the crypto program control portion of RAM, and execution of the security applet is begun at step 842. Otherwise, an error message of "ACCESS DENIED" is returned to the PC from step 840.

Cryptographic Context Files

Figure 9A:
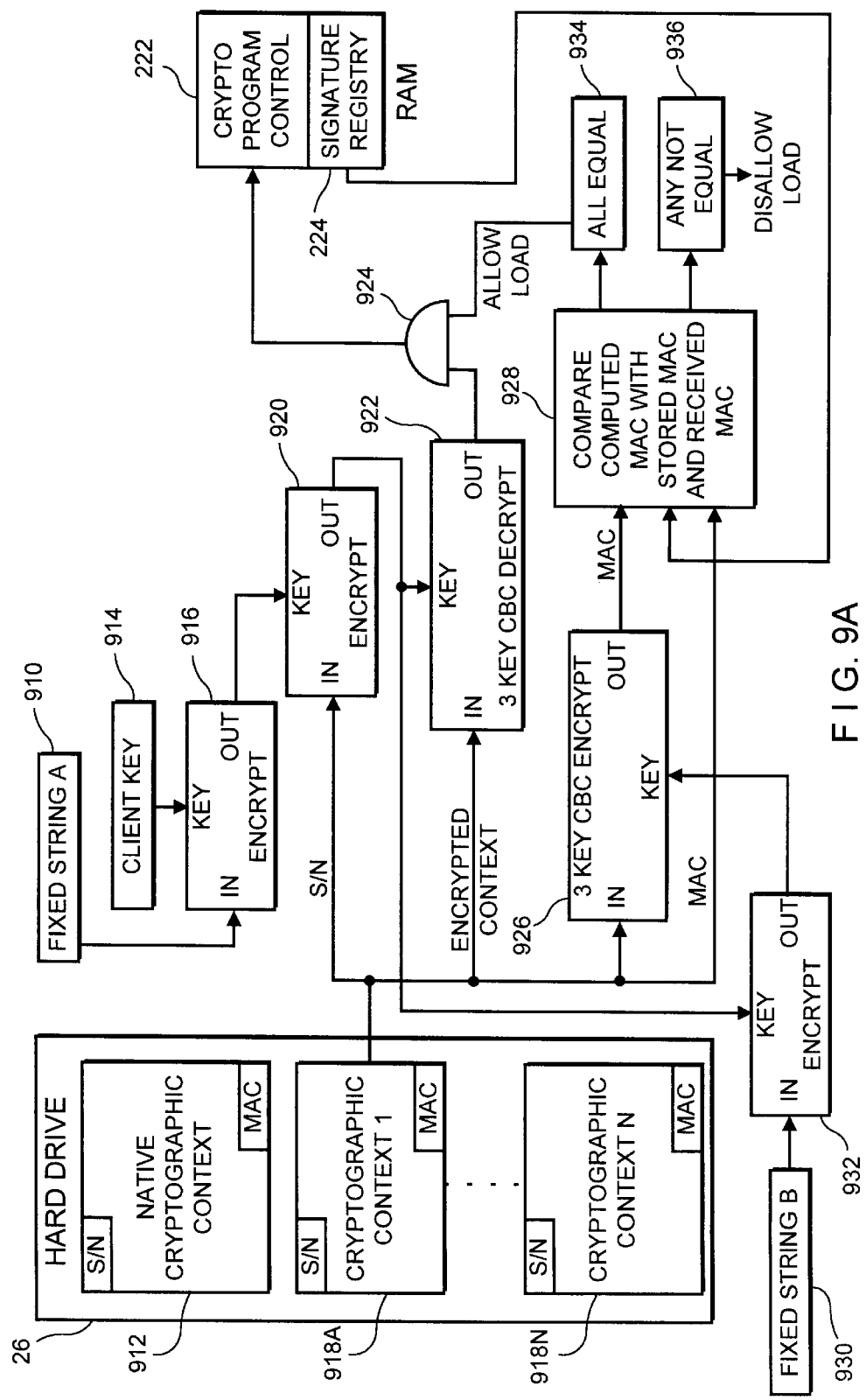
FIG. 9A is a block diagram illustrating the method and apparatus for decrypting and loading (swap in) a cryptographic context corresponding to a security applet from the PC hard drive to the crypto unit RAM memory in accordance with the present invention.
Figure 9B:
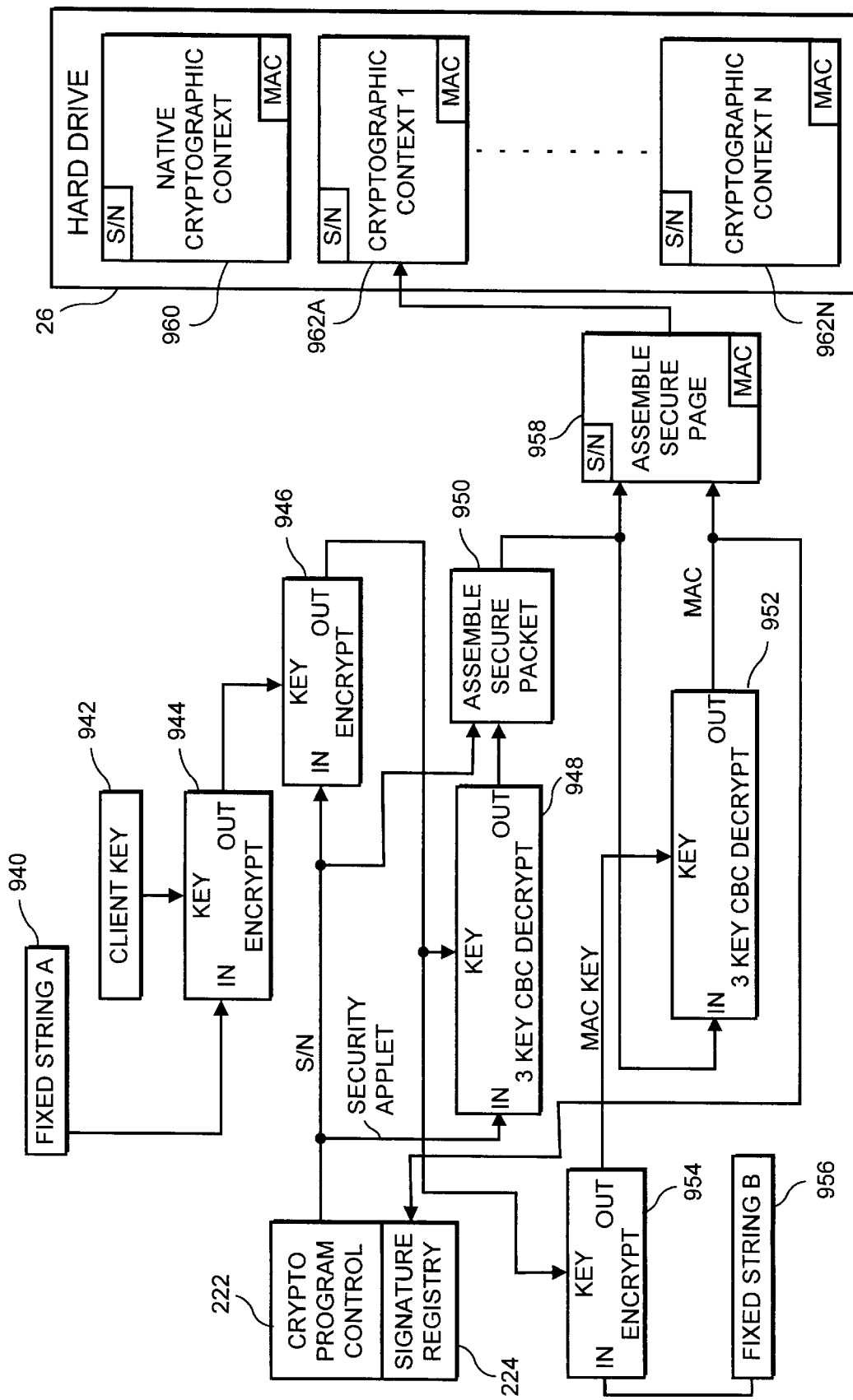
FIG. 9B is a block diagram illustrating the method and apparatus for encrypting and unloading (swap out) a cryptographic context corresponding to a security applet from the crypto unit RAM memory to the PC hard drive in accordance with the present invention.

FIG. 9A (swap in) and FIG. 9B (swap out) show the respective decryption and encryption key suites for swapping security applets (in respective cryptographic contexts) between the crypto program control portion of RAM 222 and the hard drive 26 on the desktop PC. In particular, FIG. 9A is a block diagram illustrating the method and apparatus for decrypting and loading (swap in) a cryptographic context corresponding to a security applet from the PC hard drive to the crypto unit RAM memory. FIG. 9B is a block diagram illustrating the method and apparatus for encrypting and unloading (swap out) a cryptographic context corresponding to a security applet from the crypto unit RAM memory to the PC hard drive.

Cryptographic Context Swap Out—FIG. 9B

In FIG. 9B, the contents of the crypto program control portion of RAM 222 are to be unloaded as an encrypted file 962A in hard drive 26. The signature registry portion 224 of RAM memory is not unloaded. The various encryption keys generated are based on a first fixed string A 940, a second fixed string B 956 and a secret key, called the client key 942. The client key 942 is stored in a programmable memory (220 in FIG. 2). The client key memory 942 is typically non-volatile, and may be implemented by any suitable non volatile memory, such as fuseable link, EEPROM, battery backed up RAM and the like. The stored client key 942 is unique to each crypto unit and is installed at the time of manufacture.

First fixed string A 940 is encrypted under the client key 942 in encryptor 944. The output of encryptor 944 is used as the key in encryptor 946 to encrypt the S/N (cleartext) of the applet to be unloaded. The output of encryptor 946 is used as the key to encrypt the security applet in triple key CBC encryptor 948. Note that the encryption key (to encryptor 948) for the security applet swap out is not the same key as was used for initial loading of the security applet. For initial loading of the security applet, the key used was the developer code key A. In FIG. 9B, the key used for unloading is a function of fixed string A 940, the S/N and the client key 942. Since each client key is unique to each crypto unit, the swapped out cryptographic context stored in the hard drive 26 may not be swapped back into another crypto unit. That is, once a security packet has been swapped out of a crypto unit to the hard drive 26 using one client key, the swapped out security packet (in its cryptographic context) cannot be loaded into a different crypto unit having a different client key.

To generate a MAC for the cryptographic context (which includes the security applet), a secure packet 950 is assembled. The secure packet 950 consists of the S/N in the clear and the encrypted security applet (with its cryptographic context). The MAC is generated by triple key CBC encrypting the secure packet under a key derived from the output of encryptor 954. As can be seen from FIG. 9B, the MAC key output from encryptor 954 is a function of fixed string B 956, (and via encryptors 944 and 946) the S/N, the client key 942 and fixed string A 940.

In particular, the output of encryptor 946 is input as the encryption key to encryptor 954, which encrypts fixed string B to be the MAC key to triple key CBC encryptor 952. The MAC at the output of encryptor 952 is assembled along with the secure packet to form a secure page 958. The secure page 958 is stored 962A in the hard drive 26 along with other cryptographic contexts 962N as well as the cryptographic context of the swapped out native mode security applet 960.

Cryptographic Context Swap In—FIG. 9A

When the crypto unit switches between multiple simultaneous security applications, a previously stored cryptographic context 912, 918A–918N in FIG. 9A is loaded from the hard drive 26 to the crypto program control portion 222 of on board RAM. The crypto unit uses the contents of the signature registry 224 to determine whether each of the previously stored cryptographic contexts 912, 918A to 918N will be allowed to load and run. The native mode security applet in its cryptographic context 912 is swapped in and out of the crypto unit in the same manner as the other multiple simultaneous security applets 918A—918N run by the crypto unit.

The key suite of FIG. 9A (swap in) carries out the reverse cryptographic process of the key suite in FIG. 9B (swap out). In particular, fixed string A 910 is encrypted under the client key 914 in encryptor 916. The output of encryptor 916 is used as the key in encryptor 920 to encrypt the S/N of the security applet and cryptographic context 918A to be loaded. The output of encryptor 920 is used as the applet decryption key to decrypt the security applet cryptographic context in triple key CBC decryptor 922. The applet decryption key (to decryptor 922) for the security applet swap in is the same key as was used to encrypt the security applet during swap out.

The MAC key for the cryptographic context 918A is computed by first encrypting fixed string B 930 under the applet decryption key (output of encryptor 920) in encryptor 932. The output of encryptor 932 is then used as the key in encryptor 926 to form a computed MAC over the secure page portion of the cryptographic context 918A. To check the MAC, the stored MAC from the signature registry portion 224 of RAM is retrieved. Then, all three of the computed MAC from the output of encryptor 926, the stored MAC from the signature registry 224 and the received MAC from the cryptographic context 918A are compared in comparator 928. If all three MACs are equal at step 934, then AND gate 924 is enabled to load the received security applet into the crypto program control portion 222 of RAM. If any one of the three MACs are not equal to the others at step 936, then AND gate 924 is not enabled to load the received security applet into the crypto program control portion 222 of RAM.

Security Applet Swapping

Security applets may be swapped into the crypto unit by either a one pass or a two pass process. A two pass process has been described above. That is, the ROM loader control program inspects an encrypted security applet before loading it into the crypto program control portion of onboard RAM. In a two pass implementation, if all MAC signature tests are passed, the security applet is then decrypted and loaded into onboard RAM in a second pass. If loading is disallowed on the first pass, no portion of the security applet will be loaded into onboard RAM on the second pass.

In a one pass implementation, the ROM loader control program inspects an encrypted security applet while simultaneously decrypting and loading the decrypted security applet into the crypto program control portion of onboard RAM. If the MAC signature test fails (step 840 in FIG. 8B) control over the crypto unit is not passed to the just loaded security applet. Instead, the next security applet or the native mode security applet is loaded into the crypto program control portion of onboard RAM overwriting the previously loaded disallowed security applet. However, if the MAC signature test is passed, then the ROM loader control program passes control over the crypto unit to the just loaded security applet.

A two pass embodiment is generally more secure, because no portion of the new secunty applet is loaded into the crypto program control portion of RAM 222 before all MAC signature tests are performed. A one pass embodiment generally results in faster security applet swapping because the new security applet begins execution in the onboard RAM without waiting for a second pass.

A two pass embodiment is generally more secure, because no portion of the new secunty applet is loaded into the crypto program control portion of RAM 222 before all MAC signature tests are performed. A one pass embodiment generally results in faster security applet swapping because the new security applet begins execution in the onboard RAM without waiting for a second pass.

Crypto Unit Supervision by the OPC

The crypto unit 44 in FIG. 1 is periodically supervised by the OPC 21. That is, at least once per month, or at any other selected time interval, the crypto unit 44 initiates a communication session with the OPC 21. Communication may be via modem 24 to a dial up connection or via the TCP/IP protocol over an Internet connection. In either case, the state of the crypto unit 44 is reported to the OPC 21. The purpose of the periodic communication is to synchronize the contents of the crypto unit 44 with what is expected at the OPC 21.

For example, during periodic communication with the OPC 21, the elapsed time counter 204 (FIG. 2) is checked against its expected value and synchronized if necessary. Any wide discrepancy of elapsed time may be an indication of tampering, and may result in inactivation of the crypto unit by the OPC. The OPC can set one or more of the permission bits 216 in access register 212 to inactivate a crypto unit. Once inactivated, an inactive crypto unit may not load or run any security applet.

Also, during periodic communication with the OPC 21, the signature registry (224 in FIG. 2) is checked to review which security applets have been loaded and run in that crypto unit. If a security applet has since been cancelled (i.e., system wide permission to run that security applet has been withdrawn), the cancellation flag corresponding to that security applet will be set in the signature registry. Thereafter, in conjunction with the allowance controls (226 in FIG. 2), the crypto unit 44 will not swap in (load) the cancelled security applet.

What is claimed is:

1. In a cryptographic key distribution system, including a user computer having a cryptographic control unit, a software developer computer and a cryptographic operations center, a method comprising:

generating a first security applet at said software developer computer;

transmitting said first security applet from said software developer computer to said cryptographic operations center;

receiving a first cryptographic key from said cryptographic operations center at said software developer computer;

receiving a first serial number from said cryptographic operations center at said software developer computer;

using said first cryptographic key in a process to encrypt said first security applet to form a first encrypted security applet;

appending said first serial number to said first encrypted security applet to form a first secure packet; and distributing said first secure packet to said user computer.

2. A method in accordance with claim 1, wherein said cryptographic control unit includes a program control memory, said method further comprising:

transmitting said first serial number from said cryptographic control unit to said cryptographic operations center;

receiving said first cryptographic key from said cryptographic operations center at said cryptographic control unit;

using said first cryptographic key in a process to decrypt said first security applet from said first encrypted security applet; and loading said first security applet in said program control memory.

3. A method in accordance with claim 2, wherein said software developer computer further includes a programmer key encrypted under said first cryptographic key to form a first encrypted programmer key in said first encrypted security applet, and said step of using said first cryptographic key in a process to decrypt said first security applet from said first encrypted security applet at said user computer comprises:

receiving said first secure packet including said first programmer encrypted security applet at said user computer;

decrypting said first encrypted programmer key at said user computer under said first cryptographic key to form a recovered programmer key; and decrypting said first programmer encrypted security applet under said recovered programmer key to recover said first security applet.

4. A method in accordance with claim 2, wherein said user computer includes a first user identification number, said method further comprising:

transmitting said first user identification number from said user computer to said cryptographic operations center;

storing a security applet registry table recording the correspondence between a plurality of security applets, cryptographic keys, serial numbers and user identification numbers, said security applet registry table having an entry indicating that said first serial number, said first cryptographic key and said first user identification number correspond to said first security applet.

5. A method in accordance with claim 2, wherein said user computer further includes a user computer hard drive memory, and said system further includes a second software developer computer, a second security applet having a respective second serial number and second cryptographic key corresponding thereto, said method further comprising:

encrypting the contents of said program control memory in a process using a first user computer key to form a first encrypted security context;

storing said first encrypted security context on said user computer hard drive memory; and loading said second security applet in said program control memory.

6. A method in accordance with claim 5, further comprising:

encrypting the contents of said program control memory in a process using a second user computer key to form a second encrypted security context;

storing said second encrypted security context on said user computer hard drive memory;

decrypting said first encrypted security context in a process using said first user computer key to recover said first security context; and loading said first security context in said program control memory.

7. A method in accordance with claim 1, wherein said step of using said first cryptographic key in a process to encrypt said first security applet to form a first encrypted security applet further comprises:

encrypting said first security applet at said software developer computer under a programmer key to form a first programmer encrypted security applet;

encrypting said programmer key at said software developer computer under said first cryptographic key to form a first encrypted programmer key;

appending said first encrypted programmer key and said first programmer encrypted security applet to form said first encrypted security applet.

8. A method in accordance with claim 1, further comprising:

storing a security applet registry table recording the correspondence between a plurality of security applets, cryptographic keys and serial numbers, said security applet registry table having an entry indicating that said first serial number and said first cryptographic key correspond to said first security applet.

9. In a cryptographic key distribution system, including a user computer having a cryptographic control unit, a software developer computer and a cryptographic operations center, an apparatus comprising:

means for generating a first security applet at said software developer computer;

means for transmitting said first security applet from said software developer computer to said cryptographic operations center;

means for receiving a first cryptographic key from said cryptographic operations center at said software developer computer; means for receiving a first serial number from said cryptographic operations center at said software developer computer;

means for using said first cryptographic key in a process to encrypt said first security applet to form a first encrypted security applet;

means for appending said first serial number to said first encrypted security applet to form a first secure packet; and means for distributing said first secure packet to said user computer.

10. An apparatus in accordance with claim 9, wherein said cryptographic control unit includes a program control memory, said apparatus further comprising:

means for transmitting said first serial number from said cryptographic control unit to said cryptographic operations center;

means for receiving said first cryptographic key from said cryptographic operations center at said cryptographic control unit;

means for using said first cryptographic key in a process to decrypt said first security applet from said first encrypted security applet; and means for loading said first security applet in said program control memory.

11. An apparatus in accordance with claim 10, wherein said software developer computer further includes a programmer key encrypted under said first cryptographic key to form a first encrypted programmer key in said first encrypted security applet, and said means for using said first cryptographic key in a process to decrypt said first security applet from said first programmer encrypted security applet at said user computer comprises:

means for receiving said first secure packet including said first programmer encrypted security applet at said user computer; means for decrypting said first encrypted programmer key at said user computer under said first cryptographic key to form a recovered programmer key; and means for decrypting said first programmer encrypted security applet under said recovered programmer key to recover said first security applet.

12. An apparatus in accordance with claim 10, wherein said user computer includes a first user identification number, said apparatus further comprising:

means for transmitting said first user identification number from said user computer to said cryptographic operations center;

means for storing a security applet registry table recording the correspondence between a plurality of security applets, cryptographic keys, serial numbers and user identification numbers, said security applet registry table having an entry indicating that said first serial number, said first cryptographic key and said first user identification number correspond to said first security applet.

13. An apparatus in accordance with claim 10, wherein said user computer further includes a user computer hard drive memory, and said system further includes a second software developer computer, a second security applet having a respective second serial number and second cryptographic key corresponding thereto, said apparatus further comprising:

means for encrypting the contents of said program control memory in a process using a first user computer key to form a first encrypted security context;

means for storing said first encrypted security context on said user computer hard drive memory; and means for loading said second security applet in said program control memory.

14. An apparatus in accordance with claim 13, further comprising:

means for encrypting the contents of said program control memory in a process using a second user computer key to form a second encrypted security context;

means for storing said second encrypted security context on said user computer hard drive memory;

means for decrypting said first encrypted security context in a process using said first user computer key to recover said first security context; and means for loading said first security context in said program control memory.

15. An apparatus in accordance with claim 9, wherein said means for using said first cryptographic key in a process to encrypt said first security applet to form a first encrypted security applet further comprises:

means for encrypting said first security applet at said software developer computer under a programmer key to form a first programmer encrypted security applet;

means for encrypting said programmer key at said software developer computer under said first cryptographic key to form a first encrypted programmer key;

means for appending said first encrypted programmer key and said first programmer encrypted security applet to form said first encrypted security applet.

16. An apparatus in accordance with claim 9, further comprising:

means for storing a security applet registry table recording the correspondence between a plurality of security applets, cryptographic keys and serial numbers, said security applet registry table having an entry indicating that said first serial number and said first cryptographic key correspond to said first security applet.

17. In a cryptographic key distribution system, including a user computer having a cryptographic control unit, a software developer computer and a cryptographic operations center, said software developer computer generating a first security applet and encrypting said first security applet in a process using a first cryptographic key to form a first encrypted security applet and distributing said first encrypted security applet to said user computer, a cryptographic key distribution method at said cryptographic operations center comprising:

receiving said first security applet from said software developer computer at said cryptographic operations center;

transmitting a first serial number from said cryptographic operations center to said software developer computer;

transmitting a first cryptographic key from said cryptographic operations center at said software developer computer;

receiving said first serial number from said cryptographic control unit at said cryptographic operations center;

transmitting said first cryptographic key from said cryptographic operations center to said cryptographic control unit.

18. A method in accordance with claim 17, wherein said cryptographic control unit includes a program control memory, said method further comprising:

receiving said first encrypted security applet at said cryptographic control unit including said first serial number;

transmitting said first serial number from said cryptographic control unit to said cryptographic operations center;

receiving said first cryptographic key from said cryptographic operations center at said cryptographic control unit;

using said first cryptographic key in a process to decrypt said first security applet from said first encrypted security applet; and loading said first security applet in said program control memory.

19. In a cryptographic key distribution system, having a software developer computer and a cryptographic operations center, said software developer computer generating a first security applet identified by a first serial number, and encrypting said first security applet in a process using a first cryptographic key to form a first encrypted security applet, said system further including a user computer having a cryptographic control unit with a program control memory, a method comprising:

receiving said first security applet including said first serial number at said cryptographic control unit;

transmitting said first serial number to said cryptographic operations center;

receiving said first cryptographic key from said cryptographic operations center at said cryptographic control unit;

using said first cryptographic key in a process to decrypt said first security applet from said first encrypted security applet; and loading said first security applet in said program control memory.

20. In a cryptographic key distribution system, including a user computer having a cryptographic control unit, a software developer computer and a cryptographic operations center, said software developer computer generating a first security applet and encrypting said first security applet in a process using a first cryptographic key to form a first encrypted security applet and distributing said first encrypted security applet to said user computer, a cryptographic key distribution apparatus at said cryptographic operations center comprising:

means for receiving said first security applet from said software developer computer at said cryptographic operations center;

means for transmitting a first serial number from said cryptographic operations center to said software developer computer;

means for transmitting a first cryptographic key from said cryptographic operations center at said software developer computer;

means for receiving said first serial number from said cryptographic control unit at said cryptographic operations center;

means for transmitting said first cryptographic key from said cryptographic operations center to said cryptographic control unit.

21. An apparatus in accordance with claim 20, wherein said cryptographic control unit includes a program control memory, said apparatus further comprising:

means for receiving said first encrypted security applet at said cryptographic control unit including said first serial number;

means for transmitting said first serial number from said cryptographic control unit to said cryptographic operations center;

means for receiving said first cryptographic key from said cryptographic operations center at said cryptographic control unit;

means for using said first cryptographic key in a process to decrypt said first security applet from said first encrypted security applet; and means for loading said first security applet in said program control memory.

22. In a cryptographic key distribution system, having a software developer computer and a cryptographic operations center, said software developer computer generating a first security applet identified by a first serial number, and encrypting said first security applet in a process using a first cryptographic key to form a first encrypted security applet, said system further including a user computer having a cryptographic control unit with a program control memory, an apparatus comprising:

means for receiving said first security applet including said first serial number at said cryptographic control unit;

means for transmitting said first serial number to said cryptographic operations center;

means for receiving said first cryptographic key from said cryptographic operations center at said cryptographic control unit;

means for using said first cryptographic key in a process to decrypt said first security applet from said first encrypted security applet; and loading said first security applet in said program control memory.

23. In a cryptographic key distribution system, including a user computer having a cryptographic control unit, said cryptographic control unit including a program control memory, a method comprising:

loading a first security applet in the program control memory;

encrypting the content of the program control memory in a process using a first user computer key to form a first encrypted security context;

storing the first encrypted security context on a memory external to the cryptographic control unit; and loading a second security applet in the program control memory.

24. A method in accordance with claim 23, further comprising:

encrypting the contents of the program control memory in a process using a second user computer key to form a second encrypted security context;

storing the second encrypted security context on the memory external to the cryptographic control unit;

decrypting the first encrypted security context in a process using the first user computer key to recover the first security context; and loading the first security context in the program control memory.

25. In a cryptographic key distribution system, including a user computer having a cryptographic control unit, said cryptographic control unit including a program control memory, a system comprising:

a first security applet loadable in the program control memory;

a first user computer key for encrypting the content of the program control memory to form a first encrypted security context;

a memory external to the cryptographic control unit for storing the first encrypted security context; and a second security applet loadable in the program control memory.

26. A system in accordance with claim 25, further comprising;

a second user computer key for encrypting the contents of the program control memory to form a second encrypted security context;

wherein the memory external to the cryptographic control unit stores the second encrypted security context;

wherein the first user computer key is used for decrypting the first encrypted security context to recover the first security context; and wherein the first security context is loadable in the program control memory from the memory external to the cryptographic control unit.

* * * * *